United States Patent
Kim et al.

(10) Patent No.: US 8,062,786 B2
(45) Date of Patent: Nov. 22, 2011

(54) CYLINDRICAL SECONDARY BATTERY OF IMPROVED SAFETY

(75) Inventors: Sungjong Kim, Daejeon (KR); In Sung Lee, Seoul (KR); Jaehan Jung, Daejeon (KR); Geun Ho Seo, Busan (KR); Dongsub Lee, Gyeonggi-do (KR); Munsung Kim, Daejeon (KR); Ji Hyun Lee, Chungcheongbuk-do (KR); Nakjin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 191 days.

(21) Appl. No.: 12/310,861

(22) PCT Filed: Sep. 8, 2007

(86) PCT No.: PCT/KR2007/004354
§ 371 (c)(1),
(2), (4) Date: Dec. 29, 2009

(87) PCT Pub. No.: WO2008/032957
PCT Pub. Date: Mar. 20, 2008

(65) Prior Publication Data
US 2010/0119935 A1    May 13, 2010

(30) Foreign Application Priority Data
Sep. 11, 2006 (KR) .................. 10-2006-0087129

(51) Int. Cl.
*H01M 2/02* (2006.01)
*H01M 2/00* (2006.01)
(52) U.S. Cl. ......... 429/164; 429/156; 429/163; 429/171
(58) Field of Classification Search .................. None
See application file for complete search history.

(56) References Cited

U.S. PATENT DOCUMENTS

| | | | |
|---|---|---|---|
| 5,688,294 A | 11/1997 | Mizuno et al. | |
| 6,322,922 B1 | 11/2001 | Yoshio et al. | |
| 6,811,920 B2 | 11/2004 | Murashige et al. | |
| 7,771,863 B2 * | 8/2010 | Mitani et al. | 429/56 |
| 2007/0212595 A1 * | 9/2007 | Kim et al. | 429/53 |

* cited by examiner

FOREIGN PATENT DOCUMENTS
KR    20070093171 A    9/2007

OTHER PUBLICATIONS
International Search Report, PCT/KR2007/004354.

*Primary Examiner* — Barbara Gilliam
*Assistant Examiner* — Angela Martin
(74) *Attorney, Agent, or Firm* — Lerner, David, Littenberg, Krumholz & Mentlik, LLP

(57) ABSTRACT

Disclosed herein is a cylindrical secondary battery constructed in a structure in which a crimping region, at which a cap assembly is mounted to the open upper end of a cylindrical container having an electrode assembly mounted therein, is formed at the upper end of the container, wherein the crimping region is constructed in a structure in which the upper end of the crimping region is gently bent at a predetermined radius of curvature (R), such that the crimping region surrounds a gasket located at the inside of the crimping region, the bent front end extends inward, such that the bent end presses the gasket, and an inclination of a predetermined angle is formed at the sidewall of the crimping region, such that the upper part of the crimping region is directed inward. According to the secondary battery of the present invention, the sealability of the gasket is improved, and external impacts are partially absorbed by the inclination formed at the crimping region. Consequently, the deformation of the crimping region is minimized, whereby the leakage of the electrolyte is prevented, and the safety of the battery is greatly improved.

6 Claims, 3 Drawing Sheets

CYLINDRICAL SECONDARY BATTERY OF IMPROVED SAFETY

CROSS REFERENCE TO RELATED APPLICATIONS

The present application is a national phase entry under 35 U.S.C. §371 of International Application No. PCT/KR2007/004354, filed Sep. 8, 2007, published in English, which claims priority from Korean Patent Application No. 10-2006-0087129, filed Sep. 11, 2006. The disclosures of said applications are incorporated by reference herein.

FIELD OF THE INVENTION

The present invention relates to a cylindrical secondary battery, and, more particularly, to a cylindrical secondary battery constructed in a structure in which a crimping region, at which a cap assembly is mounted to the open upper end of a cylindrical container having an electrode assembly mounted therein, is formed at the upper end of the container, wherein the crimping region is formed according to a predetermined condition, whereby the leakage of the electrolyte is prevented, and the deformation of the crimping region due to the increase of the internal pressure of the battery is prevented.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and high discharge voltage, on which much research has been carried out and which is now commercialized and widely used.

As kinds of applications and products, to which the secondary battery is applicable, are increased, kinds of batteries are also increased such that the batteries can provide outputs and capacities corresponding to the various applications and products. For example, small-sized mobile devices, such as mobile phones, personal digital assistants (PDAs), digital cameras, and laptop computers, use one or several small-sized, light secondary batteries (unit cells) for each device according to the reduction in size and weight of the corresponding products.

Based on the characteristics of external and internal structures thereof, the secondary battery may be generally classified as a cylindrical battery, a prismatic battery, or a pouch-shaped battery. Based on the construction of an electrode assembly, having a cathode/separator/anode structure, constituting the secondary battery, the secondary battery may be constructed in a jelly-roll (winding) type structure or a stacking type structure.

The jelly-roll type electrode assembly, which is generally used, is manufactured by coating a metal foil to be used as a current collector with an electrode active material, drying and pressing the coated metal foil, cutting the dried and pressed metal foil into the form of a band having a predetermined width and length, isolating an anode and a cathode from each other using a separator, and winding the anode/separator/cathode structure in a spiral shape. The jelly-roll type electrode assembly is generally suitable for cylindrical batteries. According to circumstances, the jelly-roll type electrode assembly may be compressed into a plate-shaped structure such that the jelly-roll type electrode assembly can be applied to prismatic batteries and pouch-shaped batteries.

FIG. 1 is a vertical sectional view illustrating the structure of a conventional cylindrical secondary battery.

Referring to FIG. 1, the cylindrical secondary battery 10 generally includes a cylindrical container 20, a jelly-roll type electrode assembly 30 mounted in the container 20, a cap assembly 40 coupled to the upper end of the container 20, and a crimping region 50 at which the cap assembly 40 is mounted.

The electrode assembly 30 is constructed in a structure in which a cathode 31 and an anode 32 are wound in a jelly-roll shape while a separator 33 is interposed between the cathode 31 and the anode 32. To the cathode 31 is attached a cathode tab 34, which is connected to the cap assembly 40. To the anode 32 is attached an anode tab (not shown), which is connected to the lower end of the container 20.

The cap assembly 40 includes a top cap 41 constituting a cathode terminal, a positive temperature coefficient (PTC) element 42 for intercepting electric current through the great increase of battery resistance when the interior temperature of the battery is increased, a bent safety member 43 for intercepting electric current and/or discharge gas when the interior pressure of the battery is increased, an insulating member 44 for electrically isolating the bent safety member 43 from a cap plate 45 excluding a specific portion, and the cap plate 45 connected to the cathode tab 34, which is attached to the cathode 31. The cap assembly 40 is constructed in a structure in which the top cap 41, the PTC element 42, the bent safety member 43, the insulating member 44, and the cap plate 45 are sequentially stacked.

The crimping region 50 is formed at the upper end of the container 20 such that the cap assembly 40 can be mounted to the open upper end of the container 20. More specifically, the crimping region 50 is formed by beading the upper end of the container 20, such that a depression 21 is formed at the inside of the container 20, mounting a gasket 60, sequentially inserting the outer circumferential parts of the cap plate 45, the insulating member 44, the bent safety member 43, and the top cap 41, and bending the upper end of the container 20. As a result, the crimping region 50 is formed in the shape to surround the gasket 60 located at the inside of the crimping region 50. The cap assembly 40 is mounted at the crimping region 50 by crimping and pressing.

However, it has been proven that, when external impacts are applied to the secondary battery with the above-stated construction, the sealability of the secondary battery is decreased, the resistance at the electrical connection regions of the secondary battery is changeable, and the safety of the secondary battery is lowered, whereby it is difficult for the secondary battery to exhibit desired battery performance.

For this reason, the inventors of the present invention proposed a secondary battery having an improved structure, which is disclosed in Korean Patent Application No. 2006-22950 (see FIG. 2).

Referring to FIG. 2, the cylindrical secondary battery 100 is manufactured by inserting an electrode assembly 110 into a container 200, injecting an electrolyte into the container 200, and mounting a cap assembly 300 to the open upper end of the container 200. The process for manufacturing the cylindrical secondary battery 100 is generally identical to the process for manufacturing the conventional cylindrical secondary battery. However, the structure of the cylindrical secondary battery 100 is different from that of the conventional cylindrical secondary battery. The difference will be described below in detail.

The cap assembly 300 is mounted to the open upper end of the container 200 by a crimping region 500 constructed in a structure in which a top cap 310 and a bent safety member 320 for lowering the interior pressure of the battery are in tight contact with each other inside a gasket 400 mounted to an upper beading part 210 of the container 200 for maintaining airtightness. The top cap 310 is formed such that the central part of the top cap 310 protrudes upward, and therefore, the top cap 310 serves as a cathode terminal, to which an external circuit is connected. The top cap 310 is provided along the circumference of the protruding part thereof with a plurality of through-holes 312, through which pressurized gas is discharged out of the container 200.

The bent safety member 320 is a thin-film structure through which electric current flows. The central part of the bent safety member 320 is depressed to form a depressed central part 322, and two notches 324 and 326 having different depths are formed at upper and lower bent regions of the central part 322, respectively. Below the bent safety member 320 is mounted a current intercepting member 600 for discharging gas out of the battery and, at the same time, intercepting electric current. The end 328 of the bent safety member 320 surrounds the outer circumference surface 314 of the top cap 310, and an annular protrusion 316 is formed at the lower end surface of the top cap 310.

The cylindrical secondary battery 100 with the above-stated construction solves the sealability-related problem and the resistance change problem at the electrical connection regions. However, the experiments carried out by the inventors of the present invention revealed that, when strong external impacts are applied to the secondary battery or the internal pressure of the secondary battery is abruptly increased, the crimping region constructed in the structure of FIG. 1 as well as the crimping region constructed in the structure of FIG. 2 is easily deformed, with the result that the contact surfaces between the top cap, the bent safety member, and the gasket are separated from each other, whereby the sealability of the secondary battery is lowered.

FIG. 3 is a partially enlarged view illustrating the crimping region of the cylindrical secondary battery. For convenience of description, only the section of the container forming the crimping region is shown.

Referring to FIG. 3, the crimping region 500 is constructed in a structure in which the end of the crimping region 500 is bent such that the cap assembly 300 (see FIG. 2) is stably mounted to the open upper end of the container 200 (see FIG. 2) while the gasket 400 (see FIG. 2) is disposed between the cap assembly 300 and the open upper end of the container 200. A sidewall 520 of the crimping region 500 is vertically formed in the same manner as the side of the battery, and an bent front end 510 of the crimping region 500 extends inward while the bent front end 510 of the crimping region 500 is inclined in a predetermined angle such that the bent front end 510 of the crimping region 500 presses the gasket 400 (see FIG. 2).

In this structure, however, when a strong external force is applied to the side of the battery (in the direction indicated by a horizontal arrow), for example, the sidewall 520 of the crimping region 500 is bent or pressed inward, with the result that the bent front end 510 of the crimping region 500 moves upward (see line a). Also, when a strong external force is applied to the corner of the battery (in the direction indicated by an approximately 45 degree-declining arrow), for example, the sidewall 520 of the crimping region 500 is protruded outward, with the result that the bent front end 510 of the crimping region 500 spreads (see line b). These deformations may act as a factor lowering the sealing force of the gasket by the crimping region 500.

On the other hand, when the battery is exposed to a high-temperature environment or a local short circuit occurs in the battery due to external impact applied to the battery, the decomposition reaction of an electrolyte occurs at the cathode interface, with the result that a large amount of gas is generated. The generated gas increases the internal pressure of the battery. When the internal pressure of the battery exceeds a predetermined pressure level, the bent safety member 320 (see FIG. 2) is operated to discharge the high-pressure gas to the outside. However, the crimping region is deformed due to the high-pressure gas, before the operation of the bent safety member 320, the sealability of the gasket is lowered, with the result that, the electrolyte is discharged out of the battery together with the high-pressure gas, and therefore, the safety of the battery is greatly deteriorated.

Specifically, when the crimping region is deformed, the contact surfaces between the top cap, the bent safety member, and the gasket are separated from each other, or the bent front end of the crimping region cannot strongly press the gasket, and therefore, the sealability of the gasket is partially released. As a result, the contact surfaces between the bent safety member and the top cap are instantaneously separated from each other. Consequently, the electrolyte leaks out of the battery through the gap, and therefore, the battery may catch fire or explode. As a result, the safety of the battery is greatly lowered.

Therefore, there is a high necessity for a cylindrical secondary battery that is capable of maintaining the sealability from external impacts or internal pressure.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when a crimping region of a cylindrical secondary battery is formed, such that the sidewall and the upper end of the crimping region are inclined inward at a predetermined angle, and the bent structure is constructed according to a specific condition, external impacts are partially absorbed, a gasket is brought into tight contact with the crimping region, whereby the deformation of the crimping region due to strong external impacts and the internal pressure of the battery is minimized, and therefore, the excellent sealability is maintained, and the safety of the battery is greatly improved. The present invention has been completed based on these findings.

In accordance with the present invention, the above and other objects can be accomplished by the provision of a cylindrical secondary battery constructed in a structure in which a crimping region, at which a cap assembly is mounted to the open upper end of a cylindrical container having an electrode assembly mounted therein, is formed at the upper end of the container, wherein the crimping region is constructed in a structure in which the upper end of the crimping region is gently bent at a predetermined radius of curvature R, such that the crimping region surrounds a gasket located at the inside of the crimping region, the bent front end extends inward, such that the bent end presses the gasket, and an inclination of a predetermined angle is formed at the sidewall of the crimping region, such that the upper part of the crimping region is directed inward.

In the secondary battery according to the present invention, the sidewall and the upper end of the crimping region are inclined inward at the predetermined angle. Consequently, the deformation of the crimping region due to external physical impacts, dropping or vibration, applied to the battery is minimized, whereby the leakage of an electrolyte from the battery is prevented.

Especially when strong external impacts are applied to the battery in the side direction or in the corner direction, the impacts are partially absorbed by the inclined part of the sidewall of the crimping region, and the impacts are relatively concentrated on the lower part of the sidewall of the crimping region, whereby the elastic tight contact with the gasket is maintained. Consequently, the crimping region is not deformed at all, or the crimping region is deformed to such an extent that the safety of the battery is secured, even though the strong external impacts are applied to the battery, and therefore, the safety of the battery is remarkably improved. The remarkable improvement of the safety of the battery will be revealed more clearly from Examples and Comparative examples, which will be described hereinafter.

Furthermore, when the angle of the bent front end of the crimping region is set according to a predetermined condition in the secondary battery according to the present invention, the deformation of the crimping region due to the increase of the internal pressure of the battery is minimized, and therefore, the safety of the battery is more improved.

In the present invention, the inclination is a rectilinear region which is not curved in vertical section. When the inclination forms a curve in vertical section, a region where impacts are concentrated is formed, with the result that the desired external impact absorption effect and the desired crimping region deformation preventing effect are not exhibited. The length of the inclination, forming the straight line in vertical section, may be changed depending upon the length of the crimping region and the start point of the inclination. The length of the inclination is preferably 1 to 3 mm, more preferably 2 to 3 mm.

The angle at which the sidewall of the crimping region is inclined may be appropriately decided, in consideration of the mechanical strength of the container and the elastic force and durability of the gasket, within a range not to induce the deformation of the cap assembly. The inclination angle is preferably 1 to 8 degrees, more preferably 1 to 5 degrees, from the side of the container.

When the inclination angle exceeds 8 degrees, the gasket is excessively pressed, with the result that it is difficult to maintain the inclination due to the elastic force of the gasket, and the internal safety-related parts may be deformed. On the other hand, when the inclination angle is less than 1 degree, the effect according to the present invention is not expected.

The start point of the inclination area formed at the sidewall of the crimping region is not particularly restricted; however, the start point of the inclination area may be initiated from the lower end of the crimping region or from an area near the center of the crimping region.

For example, when external impacts are applied to the battery horizontally in the side direction, the impacts are concentrated on a narrow area, in the structure in which the sidewall inclination is initiated from the lowermost end of the sidewall, with the result that cracks may be formed or very large pressure may be applied to the crimping region, whereby the crimping region may be greatly deformed. On the other hand, when the sidewall inclination is initiated from a position greatly deviated toward the upper end of the sidewall, impacts, having almost the same magnitude as the impacts applied to the lower end of the crimping region, are applied to the upper end of the crimping region, with the result that the impact elimination effect is small, and therefore, it is difficult to minimize the deformation of the crimping region. Consequently, it is preferable for the sidewall inclination to be set within a range to minimize the deformation of the crimping region. More preferably, the sidewall inclination is initiated within the upper and lower 30% of the total length of the sidewall from the center of the sidewall.

Meanwhile, a method and process of forming the inclination is not particularly restricted. For example, the inclination may be formed during the manufacture of a battery container or during the formation of the crimping region after an electrode assembly is mounted in the battery container. Preferably, however, the inclination is formed, after the cap assembly is mounted to the open upper end of the battery container, such that the installation of the cap assembly is easily performed, and the gasket, located at the inside of the crimping region, is sufficiently pressed.

Also, the crimping region according to the present invention is gently bent such that the crimping region can surround the gasket located at the inside of the crimping region. The gasket serves to electrically isolate the bent safety member from the top cap and to seal the interior of the battery. However, when the internal pressure of the battery is increased due to the overcharge of the battery or the like, the gasket may be excessively deformed, with the result that the sealability of the battery is greatly reduced, and therefore, the leakage of the electrolyte from the battery may occur. In order to prevent the deformation of the crimping region, therefore, the bent front end of the crimping region extends inward such that the bent front end sufficiently presses the gasket while the bent front end prevents the severe deformation of the gasket. Also, the bent front end of the crimping region is inclined by a predetermined angle from the side of the crimping region.

The inward extending length of the bent front end of the crimping region may be appropriately decided in consideration of the mechanical strength of the container and the elastic force and durability of the gasket. In a preferred embodiment, the bent front end of the crimping region extends, by 2 to 3 mm, from the side of the crimping region.

Also, the bent front end of the crimping region is preferably bent at an angle of 60 to 85 degrees from the sidewall of the crimping region such that the tight contact between the gasket and the crimping region is maintained, and a predetermined pressure is applied to the gasket. Consequently, the gasket is brought into tight contact with the bent end of the crimping region, while the gasket is appropriately pressed by the bent front end of the crimping region, whereby the leakage of liquid from the battery (the leakage of the electrolyte from the battery) due to the internal pressure of the battery is prevented, and therefore, the safety of the battery is greatly improved.

When the inward extending length of the bent front end of the crimping region is too small or the angle of the bent front end of the crimping region is too large, it is possible to sufficiently press the gasket, and therefore, the electrolyte leakage phenomenon may occur upon the deformation of the crimping region. On the other hand, when the inward extending length of the bent front end of the crimping region is too large or the angle of the bent front end of the crimping region is too small, the bent end of the crimping region severely presses the gasket, with the result that the gasket may be damaged.

The bending process is not particularly restricted. For example, the bending process may be performed intermittently. Specifically, the bent front end of the crimping region is primarily bent from the side of the crimping region, such that the bent front end of the crimping region is approximately at a right angle to the central axis of the top cap, the bent front end of the crimping region is secondarily bent at an angle of 60 to 85 degrees, such that the bent end of the crimping region is brought into tight contact with the upper end of the gasket, and then the bent front end of the crimping region is pressed. At this time, the time interval between the primary bending process and the secondary bending process means the slight time interval at which stress is sufficiently dispersed from the bent area where the stress is concentrated when bending. This intermittent bending process greatly reduces a possibility that the bent area is broken.

As previously defined, the crimping region is constructed in a structure in which the upper end of the crimping region is gently bent at the predetermined radius of curvature R, and, preferably, the radius of curvature has a value of 0.3 to 2 mm.

When the radius of curvature R exceeds 2 mm, the bent area is easily deformed by stress, when an external force is applied to the battery in the side direction, as shown in FIG. 3, with the result that the bent front end of the crimping region is separated from the gasket, and therefore, the electrolyte leakage phenomenon may occur. On the other hand, when the radius of curvature R is less than 0.3 mm, the deformation of the bent area or the separation of the bent end due to the external force applied to the battery in the side direction are prevented. However, when an external force is applied to the top of the battery, stress is concentrated on the bent area, with the result that cracks occur at the corresponding area. Also, a sharp angle in section is formed, and therefore, the handling of the battery during the use of the battery is difficult.

Preferably, the cylindrical container has a thickness of 0.15 to 0.35 mm. When the thickness of the cylindrical container is too small, the mechanical strength of the battery is inevitably lowered, and a welding defect may occur while the cathode lead is welded to the bottom of the cylindrical container. Consequently, the bottom of the cylindrical container may be ruptured or severely damaged when welding. On the other hand, when the thickness of the cylindrical container is too large, the total weight of the battery is increased, and the area of the electrode assembly is relatively reduced, whereby the capacity of the battery is reduced. Also, it is not easy to perform the beading and crimping process to the open upper end of the container.

The material for the cylindrical container is not particularly restricted. Preferably, the cylindrical container is made of one selected from a group consisting of stainless steel, steel, aluminum, and equivalents thereof.

The battery according to the present invention may be used as a power source for devices requiring high-level safety because external impacts are frequently applied to the battery or a possibility of an internal short circuit of the battery is very strong. Preferably, the battery according to the present invention is used as a cylindrical battery for a laptop personal computer (PC) which may be frequently exposed to external impacts during the use of the laptop personal computer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 1:
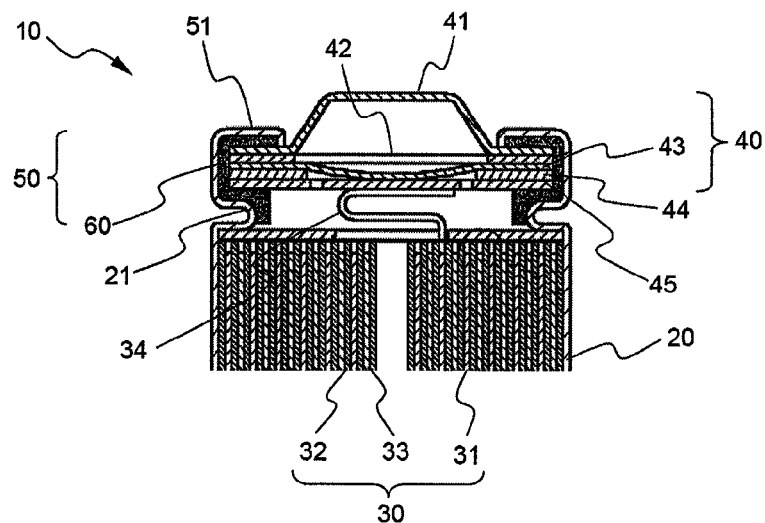
FIG. 1 is a sectional view typically illustrating a representative upper structure of a conventional cylindrical secondary battery.
Figure 2:
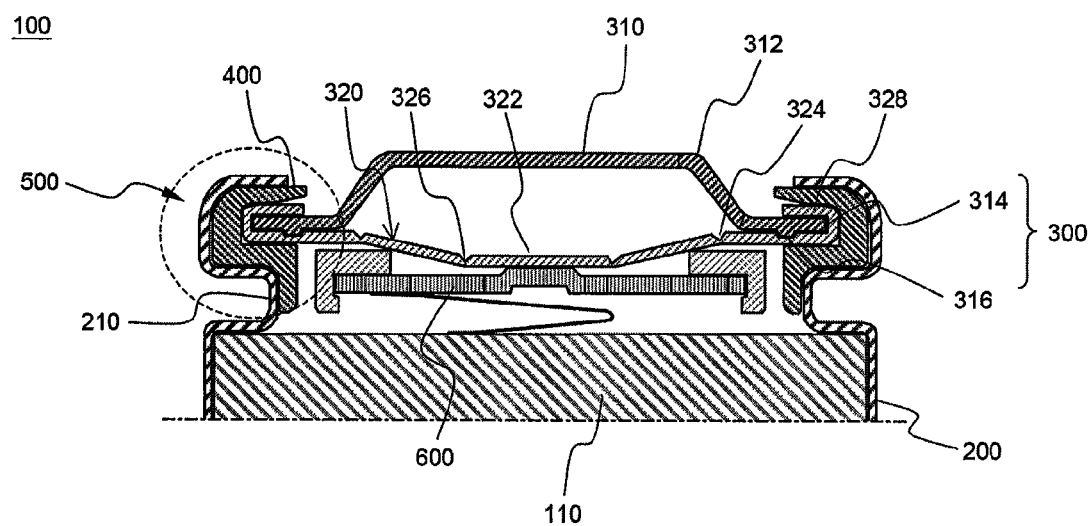
FIG. 2 is a sectional view typically illustrating a cylindrical secondary battery disclosed in Korean Patent Application No. 2006-22950.
Figure 3:
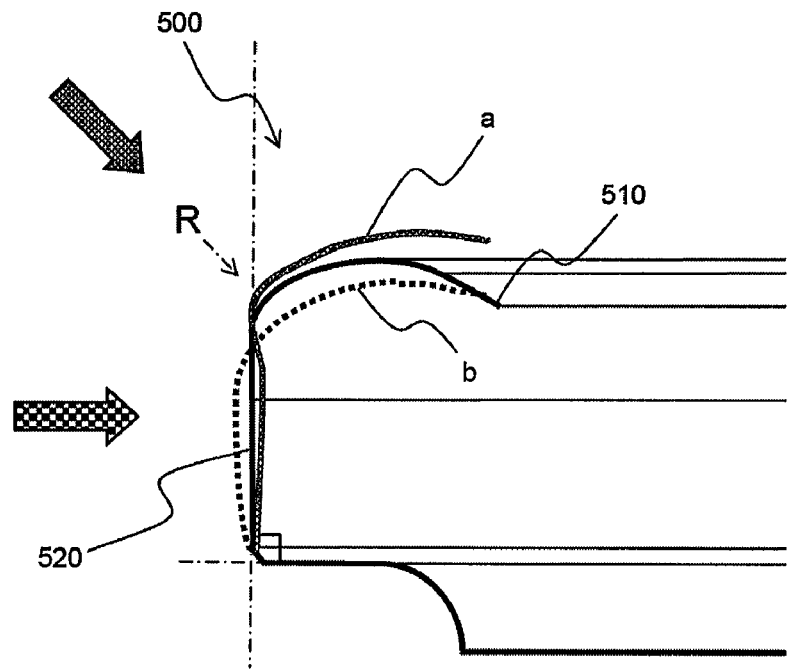
FIG. 3 is an enlarged view of a crimping region shown in FIG. 2.
Figure 4:
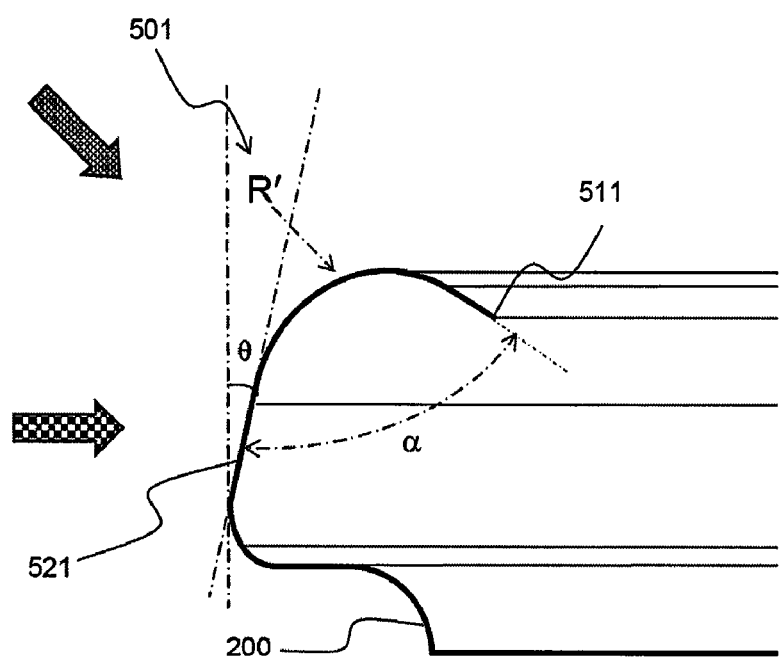
FIG. 4 is an enlarged view illustrating a crimping region of a cylindrical secondary battery according to a preferred embodiment of the present invention.
Figure 5:
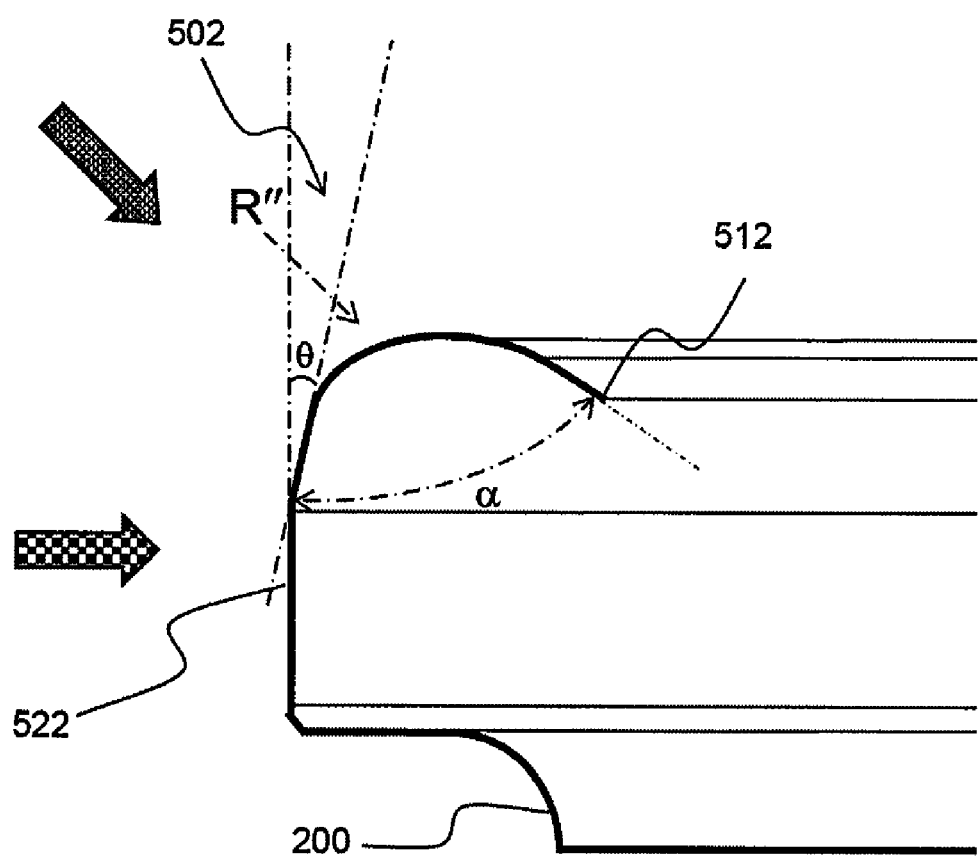
FIG. 5 is an enlarged view illustrating a crimping region of a cylindrical secondary battery according to another preferred embodiment of the present invention.

FIG. 4 is an enlarged view typically illustrating a crimping region of a cylindrical secondary battery according to a preferred embodiment of the present invention, and FIG. 5 is an enlarged view typically illustrating a crimping region of a cylindrical secondary battery according to another preferred embodiment of the present invention. The crimping structures of FIGS. 4 and 5 correspond to that of FIG. 3. The drawings illustrate the inclination of the sidewall of the crimping region, the radius of curvature of the bent area of the crimping region, and the extension shape and angle of the bent front end of the crimping region.

Referring to these drawings, the crimping regions 501 and 502 are similar in shape to the crimping region 500 of FIG. 3. However, a predetermined inclination is formed at the sidewall area of the crimping region, and therefore, the upper end of the sidewall is somewhat gentle at the same angle.

In the structure shown in FIG. 4, the sidewall area 521 is constructed in a structure in which the inclination is initiated at the area deviated downward from the center of the sidewall area 521 within a range of approximately 30% the total length of the crimping region. In the structure shown in FIG. 5, on the other hand, the sidewall area 522 is constructed in a structure in which the inclination is initiated near the center of the crimping region.

The inclination has an angle $\theta$ of 1 to 8 degrees from the vertical surface of the sidewall. Consequently, as compared to the sidewall 520 of FIG. 3, the sidewall areas 521 and 522 exhibit a large pressing force against the gasket (not shown) and high sealability even in the condition that the inward extending lengths are the same.

Consequently, when a strong external force is applied to the battery in the sidewall direction, the impact is partially absorbed by the sidewall inclination formed at the predetermined angle $\theta$, and the impact is concentrated on the lower ends of the sidewall areas 521 and 522 of the crimping region. As a result, a relatively small impact is applied to the bent front ends 511 and 512, located at the upper ends of the crimping regions, and therefore, the tight contact with the gasket, located at the inside of the crimping region 501, is maintained.

Also, when a strong external force is applied to the battery in the corner direction, the sidewall areas 521 and 522 are deformed outward, with the result that the bent front ends 511 and 512 moves upward. At this time, however, the tight contact with the gasket is maintained by the sidewall inclination. Consequently, the crimping region 500, constructed in a structure in which the inclination is formed at the predetermined angle $\theta$, exhibits high resistance against an external force and thus restrains the shape deformation.

Furthermore, the bent front end 511, bent at an angle $\alpha$ of 60 to 85 degrees, exhibits high shape maintainability, even when the internal pressure of the battery is increased. Consequently, the tight contact with the gasket is not greatly reduced, and therefore, the leakage of the electrolyte is prevented.

The bent front end 511 extends inward while the bent front end 511 is bent at the predetermine angle α from the side of the crimping regions 501. The radius of curvature R, the bent angle α, and the inward extending length are the same as the above description.

Hereinafter, examples of the present invention will be described in more detail. It should be noted, however, that the scope of the present invention is not limited by the illustrated examples.

EXAMPLE 1

A top cap and a cylindrical container were manufactured using a cold rolled carbon steel sheet (SPCE) coated with nickel (Ni), an electrode assembly was mounted in the cylindrical container, a beading process was carried out to the cylindrical container at an area corresponding to the upper end of the electrode assembly to form a crimping region, a gasket was inserted into the inside of the crimping region, and a cap assembly was mounted at the crimping region. Subsequently, the crimping region was gently bent into the structure as shown in FIG. 4 such that the sidewall of the crimping region was inclined by two degrees from the side of the container. Also, the end of the crimping region was bent inward such that the bent end of the crimping region was inclined by 70 degrees from the side of the container. At this time, the end of the crimping region was bent such that the bent end of the crimping region had a radius of curvature of 1.3 mm. Subsequently, a crimping and pressing process was carried out to manufacture a standard 18650 cylindrical secondary battery (having a diameter of 18 mm and a length of 65 mm). The bent front end of the crimping region extended inward by approximately 2.4 mm from the side of the crimping region.

EXAMPLE 2

A cylindrical secondary battery was manufactured in the same manner as Example 1 except that the sidewall inclination of the crimping region was initiated as shown in FIG. 5.

COMPARATIVE EXAMPLE 1

A cylindrical secondary battery was manufactured according to the same method as Example 1 except that the sidewall of the crimping region formed an angle of 0 degrees with the side of the container.

COMPARATIVE EXAMPLE 2

A cylindrical secondary battery was manufactured according to the same method as Example 1 except that the sidewall of the crimping region formed an angle of 9 degrees with the side of the container.

COMPARATIVE EXAMPLE 3

A cylindrical secondary battery was manufactured according to the same method as Example 1 except that the end of the crimping region was bent such that the bent end of the crimping region formed an angle of 90 degrees with the side of the container.

COMPARATIVE EXAMPLE 4

A cylindrical secondary battery was manufactured according to the same method as Example 1 except that the end of the crimping region was bent such that the bent end of the crimping region formed an angle of 50 degrees with the side of the container.

EXPERIMENTAL EXAMPLE 1

Impact experiments were carried out on 10 batteries manufactured as described in Example 1 and Example 2 and 10 batteries manufactured as described in Comparative example 1 and Comparative example 2 at a voltage of 4.2 V. In the impact experiments, the batteries, charged with a voltage of 4.2 V, were freely dropped onto a wood floor from a height of 1 m, such that the tops, the bottoms, and the sides of the respective batteries collided with the wood floor, to confirm whether an electrolyte leaked from the batteries or not. At this time, the batteries were dropped such that the tops, the bottoms, and the sides of the respective batteries collided with the wood floor 30 times each.

The experiment results revealed that the electrolyte did not leak from all the batteries manufactured as described in Example 1 and Example 2; however, the electrolyte leaked from three batteries out of the batteries manufactured as described in Comparative example 1, and the electrolyte leaked from one battery out of the batteries manufactured as described in Comparative example 1.

EXPERIMENTAL EXAMPLE 2

While 30 batteries manufactured as described in Example 1 and Example 2 and 30 batteries manufactured as described in Comparative example 1 to Comparative example 4 were placed upside down, a pressure of 15 Kgf was applied into the cells so as to confirm whether an electrolyte leaked from the respective batteries before the operation of the current intercepting member (bent safety member). The results are indicated in Table 1 below.

TABLE 1

| | Occurrence of leakage before breakage of current intercepting member | Occurrence of leakage after breakage of current intercepting member | Nonoccurrence of leakage |
|---|---|---|---|
| Example 1 | 0/30 | 0/30 | 30 |
| Example 2 | 0/30 | 0/30 | 30 |
| Comparative example 1 | 1/30 | 5/29 | 24 |
| Comparative example 2 | 0/30 | 2/30 | 28 |
| Comparative example 3 | 2/30 | 5/28 | 23 |
| Comparative example 4 | 0/30 | 3/30 | 27 |

It can be seen from Table 1 above that the electrolyte did not leak from the batteries of Example 1 and Example 2, whereas the electrolyte leaked from seven batteries of Comparative example 3 and three batteries of Comparative example 4 before and after the operation of the current intercepting member. Consequently, it can be seen that the batteries according to the present invention exhibited excellent sealability even after the operation of the current intercepting member.

INDUSTRIAL APPLICABILITY

As apparent from the above description, the secondary battery according to the present invention is constructed in a structure in which an inclination of a predetermined angle is formed at the sidewall of the crimping region, whereby it is possible to partially absorb external impacts. Also, the upper end of the crimping region is bent according to a predetermined condition, whereby the sealability with the gasket is excellent, and the deformation of the crimping region is minimized. Consequently, it is possible to restrain the increase of the contact resistance at the contact surface of the battery when external physical impacts are applied to the battery, for example, when the battery is dropped, and to prevent the leakage of the electrolyte, whereby the safety of the battery is greatly improved.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A cylindrical secondary battery constructed in a structure in which a crimping region, at which a cap assembly is mounted to the open upper end of a cylindrical container having an electrode assembly mounted therein, is formed at the upper end of the container, wherein the crimping region is constructed in a structure in which the upper end of the crimping region is gently bent at a radius of curvature (R), having a value of 0.3 to 2 mm, such that the crimping region surrounds a gasket located at the inside of the crimping region, the bent front end extends inward, such that the bent end presses the gasket, and an inclination of an angle, which is 1 to 8 degrees from the side of the container, is formed at the sidewall of the crimping region, such that the upper part of the crimping region is directed inward.

2. The cylindrical secondary battery according to claim 1, wherein the angle is 1 to 5 degrees from the side of the container.

3. The cylindrical secondary battery according to claim 1, wherein the inclination is initiated within the upper and lower 30% of the total length of the sidewall from the center of the sidewall.

4. The cylindrical secondary battery according to claim 1, wherein the bent front end extends, by 2 to 3 mm, from the side of the crimping region.

5. The cylindrical secondary battery according to claim 1, wherein the bent front end is bent at an angle of 60 to 85 degrees from the sidewall of the crimping region.

6. The cylindrical secondary battery according to claim 1, wherein the cylindrical container has a thickness of 0.15 to 0.35 mm.

\* \* \* \* \*